United States Patent [19]

Ryan et al.

[11] 4,402,514

[45] Sep. 6, 1983

[54] FLUID-COOLED OIL DEFLECTOR

[75] Inventors: Francis D. Ryan; Harry H. Ho, both of Schenectady, N.Y.

[73] Assignee: General Electric Company, Schenectady, N.Y.

[21] Appl. No.: 300,809

[22] Filed: Sep. 10, 1981

[51] Int. Cl.³ .......................... F16J 15/54; F16L 33/72
[52] U.S. Cl. ........................................ 277/22; 277/53; 277/67; 384/144
[58] Field of Search ............... 384/130, 392, 144, 393, 384/313, 399, 316; 277/67, 133, 68, 15, 69, 22, 53; 415/175, 180; 184/7 R

[56] References Cited

U.S. PATENT DOCUMENTS

| | | | |
|---|---|---|---|
| 3,241,842 | 3/1966 | Schweiger et al. | 277/68 X |
| 3,614,112 | 10/1971 | Herzog | 277/67 X |
| 3,756,742 | 9/1973 | Speck et al. | 415/175 |
| 3,853,327 | 12/1974 | Nellis | 277/133 X |

Primary Examiner—Stuart S. Levy
Assistant Examiner—David Werner
Attorney, Agent, or Firm—Robert C. Kain, Jr.; John F. Ahern

[57] ABSTRACT

Oil deflectors are used in large rotary machines to seal against oil leakage which travels axially along the shaft from a flood lubricated bearing in which the shaft is mounted for rotation. Disclosed is a fluid-cooled oil deflector in which cooling is provided by apparatus which distributes, in a substantially uniform flow pattern, a stream of cooling fluid across the inner surface of the support plate which holds a labyrinth seal in place around the rotating shaft. Preferably the cooling fluid is taken as a side stream of oil from the main supply stream which passes directly to the bearings for lubrication. The apparatus includes a first arcuate, substantially semi-circular, upper gutter which spans the shaft at an outer location on the support plate. Cooling oil, or other fluid, received at the radially outer side of the gutter, generally at the apex of the arc, passes through spaced-apart slots in the gutter and down a portion of the inner surface of the support plate. A second arcuate gutter, having a smaller radius of curvature than the upper gutter is located directly below and in proximity to the shaft to collect fluid streaming down the inner surface of the support and to redistribute the collected fluid through spaced-apart slots in the second gutter. The second gutter is effective to redistribute, into a substantially uniform flow pattern, fluid which has been diverted from the upper flow pattern by structure surrounding the shaft.

8 Claims, 2 Drawing Figures

FLUID-COOLED OIL DEFLECTOR

BACKGROUND OF THE INVENTION

This invention relates generally to continuous flow lubricated bearings for rotating shafts of large machinery and in particular to oil deflector apparatus which prevents oil leakage from the housings of these bearings.

Journal bearings for large rotary machines (e.g., large steam turbines) are provided with a continuous flow of lubricating oil according to a technique often referred to as "flood lubrication". Although the bulk of the lubricating oil flowing through a bearing is confined to the bearing housing, a certain amount does escape, with a portion of the leakage traveling axially along the rotating shaft. To confine this oil, oil deflector sealing arrangements are provided around the shaft adjacent certain of the bearings. The oil deflector generally includes a labyrinth seal having seal rings, or "teeth", and an oil collection means for trapping and draining off to the lubricating oil reservoir any oil traveling along the shaft.

A problem with oil deflector apparatus (particularly with machines operating at elevated temperatures, such as a steam turbine) has resulted from the carbonization of oil within the oil deflector apparatus and a buildup of solid carbonization products within the teeth of the seal. In some instances the carbonization problem has been severe enough to cause damage to the shaft, producing machine vibrations to the point that the machine has become inoperable. For a large steam turbine of the type used in the generation of electrical power on a commercial scale, machine outages are very costly and provisions for guarding against such situations are continually being sought.

Investigations have shown that the degree of oil carbonization within oil deflector apparatus is directly related to the temperature of the apparatus; the higher the temperature, the more likelihood there is of carbonization occurring. Although radiant heat shields are commonly utilized to guard the deflector from heat radiated by nearby high temperature components, they have not been entirely successful in overcoming the carbonization problems.

It is, therefore, among the objects of the present invention to provide oil deflector apparatus which overcomes those problems outlined above. Further, and more particularly, it is an object of the present invention to provide an oil deflector which is fluidly cooled continuously during machine operation and which lends itself to cooling by oil drawn from the supply providing oil for bearing lubrication.

Still further objects and advantages of the invention will be apparent from the ensuing description.

SUMMARY OF THE INVENTION

In a preferred form of the invention, for a horizontally mounted shaft, these and other objects are attained by providing apparatus for distributing, in a substantially uniform flow pattern, a stream of cooling oil, or other fluid, across the inner surface of the support plate which holds the labyrinth seal in place around the shaft. Most preferably the cooling fluid is taken as a side stream of oil from the main oil supply which provides a flow stream of oil to the machine's bearings for lubrication. The fluid distributor apparatus includes a first arcuate, substantially semi-circular, upper gutter which spans the shaft at an outer location on the support plate. In this preferred form of the invention, cooling oil received at the radially outer side of the gutter, generally at the apex of the arc, passes through spaced-apart slots in the gutter as well as from the ends of the gutter to form a film flowing down a portion of the inner surface of the support plate. A second arcuate gutter, having a smaller radius of curvature than the upper gutter, is located directly below and in proximity to the shaft to collect oil streaming down the inner surface of the support plate and to redistribute the collected oil via spaced-apart slots in the second gutter. In particular, the second gutter is effective to redistribute into a substantially uniform flow pattern, oil which has been diverted from the upper flow pattern by grooves in the support plate surrounding the shaft. For reasons of economy and ease of manufacture, the second gutter is preferably in the form of two separate smaller arcuate gutters with an intervening arcuate space.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

DETAILED DESCRIPTION OF THE INVENTION

Figure 1:
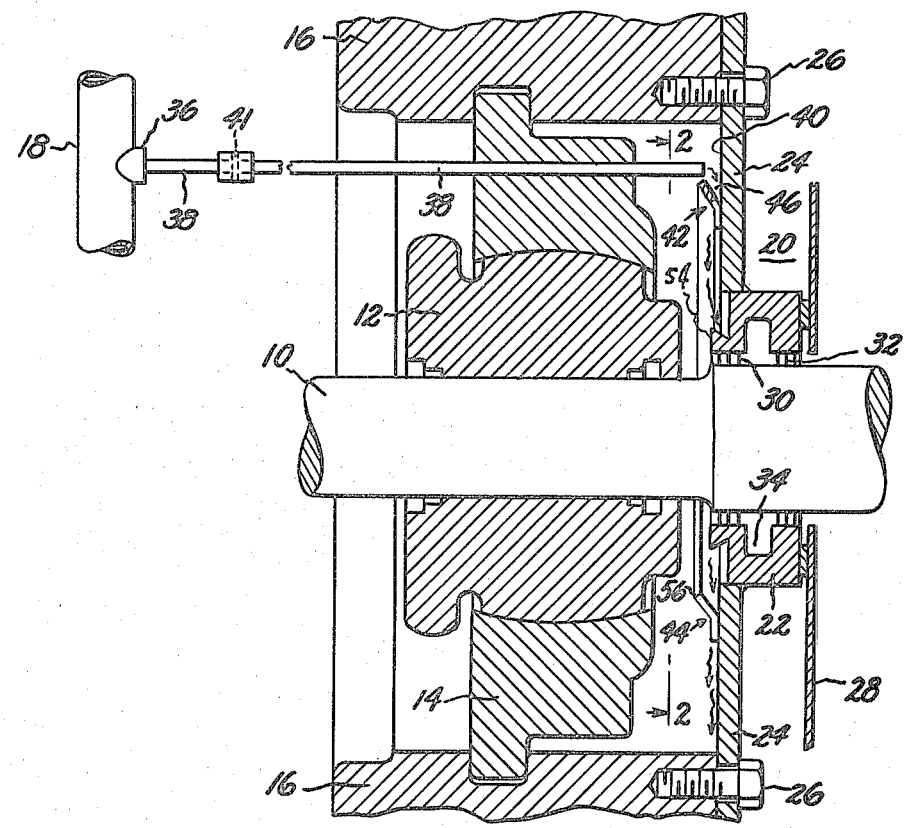
FIG. 1 is a horizontal view, partially in section, of a shaft and bearing, and a preferred embodiment of a fluid-cooled oil deflector according to the invention.

Referring to a preferred form of the invention as illustrated in FIG. 1, a horizontally oriented shaft 10 is mounted for rotation in a flood lubricated journal bearing 12 which is retained by a housing 14 affixed to stationary structure 16. The rotary machine in which the present invention is utilized may, for example, be a large steam turbine in which the structure 16 is the turbine standard and the shaft 10 is the central shaft which carries the turbine wheel assemblies (not specifically shown). Generally, oil to the bearing 12, as well as to all other bearings of the machine, is supplied by pipe 18. The lubricant input and drain connections to the bearing 12, are not specifically shown, however, to simplify the illustration of the invention. The pipe 18 is, of course, connected to a lubricating oil pumping system which is also omitted from the drawings for simplification since it need not be illustrated for an understanding of the invention.

Adjacent the bearing 12 and to the side thereof at which the shaft emerges from the structure 16 is an oil deflector assembly, generally designated as 20. The oil deflector 20 functions primarily to prevent oil leakage, out of bearing 12, from escaping axially along the shaft 10. The oil deflector 20 includes a labyrinth seal 22 encompassing the shaft 10 and a seal support plate 24 affixed to the structure 16 by bolts 26 to provide overall support. A radiant heat shield 28 may be included adjacent the oil deflector 20 to ward off a portion of any radiant energy from other, hotter sections of the rotary machine.

Labyrinth seal 22 includes an inner set of seal rings, or teeth, 30 and an outer set of seal rings, or teeth, 32. Each ring of seal rings 30 or 32 encircles the shaft 10 with a small working clearance between the surface of the shaft 10 and the radially inner edge of the ring. An annular chamber 34 is provided for collection and drainage of oil. A labyrinth seal generally equivalent to seal 22 of FIG. 1 is disclosed in U.S. Pat. No. 3,614,112, the disclosure of which is incorporated herein by reference.

To maintain the temperature of the oil deflector 20 at approximately the same temperature as the lubricating oil being supplied to the bearing 12 and to prevent overheating leading to carbonization of oil in deflector teeth 30 and 32, means are provided for continuous cooling of the oil deflector 20 by a side stream of oil taken from the main bearing oil supply pipe 18. Thus, oil from pipe 18 is taken from a tee connection 36 to flow through a smaller pipe, or tubing line, 38 to the vicinity of the inner surface area 40 of the support plate 24. An orifice 41 is fitted into the tubing line 38 to set the flow rate of oil in the side stream. It will be recognized, however, that an adjustable valving means may be utilized for controlling the oil flow rate instead of using a fixed-size orifice as shown.

Figure 2:
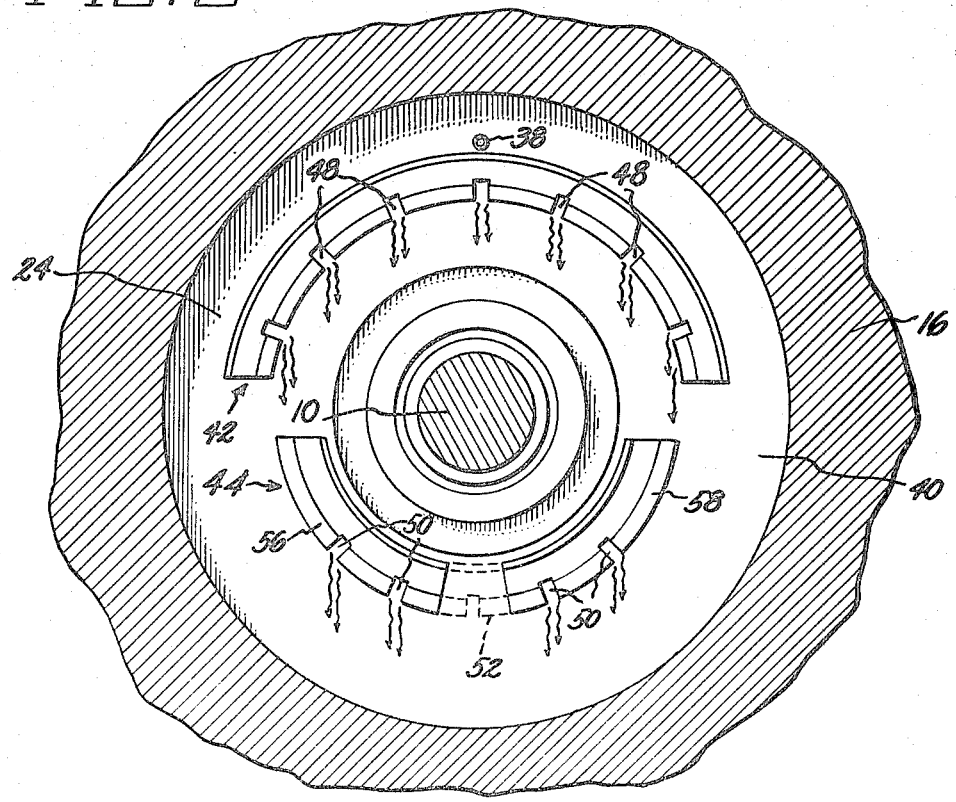
FIG. 2 is a view of the fluid-cooled oil deflector of FIG. 1 taken along the line 2—2 and illustrating an alternate embodiment of the invention in which the lower gutter is of either single or double arc construction.

Affixed to the inner surface 40 of the support plate 24 are first and second arcuate shaped gutters 42 and 44, respectively. These gutters, 42 and 44, provide means for distributing the flow of cooling oil in a substantially uniform flow pattern across a significant portion of the inner surface area 40 surrounding the shaft 10. Gutters 42 and 44 may be attached by any convenient means (e.g., welding) to the inner surface 40. FIG. 2 should be referred to for a full view of cooling oil flow distributing gutters 42 and 44.

During operation, oil from tubing 38 is continuously discharged into the trough 46 at the radially outer side of the upper gutter and generally at the apex of the arc formed by the gutter 42. A plurality of Spaced-apart slots 48 through the gutter 42 provide for distribution of the cooling oil in streams down across the upper portion of the inner surface 40. Arrowed lines in the Figures generally indicate the oil flow paths and pattern. Slots 48 are sized in accordance with the pressure in pipe 18, the flow area of orifice 41, and the size of the oil deflector. Consideration of these factors insures that oil flow occurs through all of the slots 48. Although slots 48 are illustrated to be all of the same size, it will be recognized as desirable in some instances to have slots of varying size to provide an even distribution of the oil. In such case, the smaller area slots are generally located closer to the apex of the gutter 42 and to the oil supply tube 38.

Cooling oil streaming across the inner surface 40 of the support plate 24 is diverted by gutter 54 which is an integral portion of seal 22. The second arcuate gutter 44 is positioned directly below gutter 54 and collects, at its radially inner side, the oil diverted by gutter 54 and a portion of the undiverted oil from a first portion of the uniform oil flow pattern. Thus, it is preferable that the lower gutter 44 have a smaller radius of curvature than the upper gutter 42 and be positioned in fairly close proximity to gutter 54. The oil collected in lower gutter 44 is redistributed across the lower portion of the surface 40 by slots 50. Slots 50 may all be of the same size or may be unequal in size depending on the shaft diameter and oil flow rate. It has been found, for example, that slots, such as slots 48 and 50, having a width of between $\frac{1}{4}$ and $\frac{1}{2}''$ provide an even flow distribution pattern in an oil deflector for a steam turbine.

Since means are conventionally provided for draining free oil in the vicinity of the bearing 12, oil draining from the lower portion of the support plate 24 flows to the bottom of the turbine standard, joins the oil from the bearing, and returns to the lubricating oil reservoir. By using oil as the cooling fluid, the drainage mixes freely with the lubricating oil from the bearing and can be conveniently routed to a main oil reservoir. However, as is apparent, other cooling fluids besides lubricating oil may be used. In such cases, drainage and supply of lubricating fluid and cooling fluid are kept separate.

For ease of manufacturing and for economy, the lower gutter 44 may be fabricated as two separate, symmetrically positioned smaller arcuate gutters. For example, the section of lower gutter 44 shown in dashed lines (indicated at 52) would be omitted to define an arcuate slot between smaller segments 56 and 58. Functionally, the two embodiments are equivalent.

From the foregoing it will be recognized that an oil deflector as described and illustrated will operate at considerably lower temperatures than one similarly disposed and without the fluid cooling means of the present invention. It will further be recognized that, while there has been shown and described what is considered a preferred embodiment of the invention, various other modifications may be made therein. For example, while the upper flow distribution gutter 42 is shown herein as affixed to the inner surface of the support plate 24, it will occur to others of ordinary skill in the art to provide a flow distributing means affixed to other structural elements in the area of the oil deflector. It is intended to claim all such modifications which fall within the true spirit and scope of the present invention.

The invention claimed is:

1. In combination with a machine having a generally horizontal shaft mounted for rotation within at least one flow lubricated bearing, a fluid-cooled oil deflector comprising:

seal means encompassing the shaft adjacent the bearing to prevent oil leakage from said bearing axially along the shaft;

a seal support means affixed to the machine for supporting the seal means, said support means having an inner surface facing the bearing;

means for supplying a continuous stream of cooling fluid to such oil deflector;

a first arcuate gutter affixed to the inner surface of said support means and spanning the shaft at an upper location radially outward from the shaft, said gutter having a plurality of spaced-apart slots for discharging fluid, received substantially at the apex of said gutter and at the radially outer side thereof from said cooling fluid supply means, to flow downward forming a first portion of a substantially uniform flow pattern; and a second arcuate gutter affixed to the inner surface of said support means and spanning the shaft at a lower location radially outward from the shaft, said gutter having a plurality of spaced-apart slots for discharging fluid, collected at the radially inner side of said gutter from said first portion of said uniform flow pattern, to flow downward forming a second portion of said uniform flow pattern across said inner surface of said support means.

2. The combination of claim 1 wherein:

the inner surface of said support means is substantially planar; the radius of curvature of said first arcuate gutter is sufficiently large to permit said gutter to span substantially the entire planar surface; and the radius of curvature of said second arcuate gutter is less than the radius of curvature of said first arcuate gutter and said second arcuate gutter is located in proximity to the surface of said shaft.

3. The combination of claim 2 wherein said second arcuate gutter is divided into a pair of smaller gutters defining an arcuate space between said pair of gutters, said arcuate space being positioned substantially directly below said shaft; and said first arcuate gutter is substantially semi-circumferential around said shaft.

4. The combination of claims 1, 2, or 3 wherein said cooling fluid supply means comprises a side stream of oil taken from an oil flow stream providing lubricant to said bearing.

5. The combination of claim 4 wherein the plurality of spaced-apart slots in said first and second arcuate gutters are varied in size.

6. The combination of claim 4 wherein said side stream includes means for setting the cooling-fluid flow rate.

7. The combination of claim 5 wherein said means for setting the cooling-fluid flow rate comprises an orifice of fixed area.

8. The combination of claim 7 wherein said seal means is a labyrinth seal.

* * * * *